(No Model.)
F. CALLAN.
TONGUE SUPPORT FOR VEHICLES.
No. 321,082. Patented June 30, 1885.
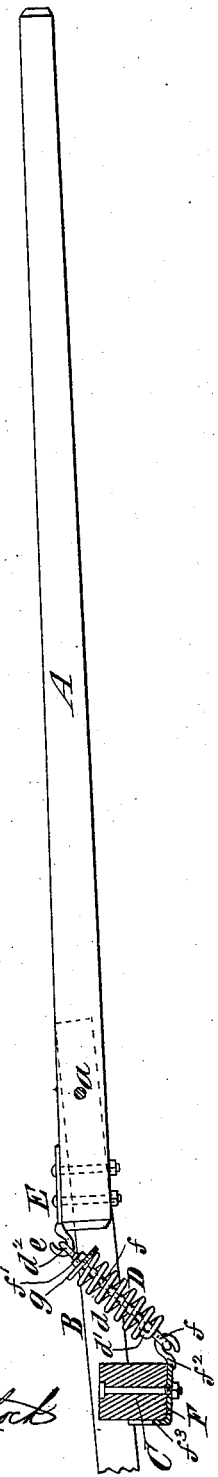
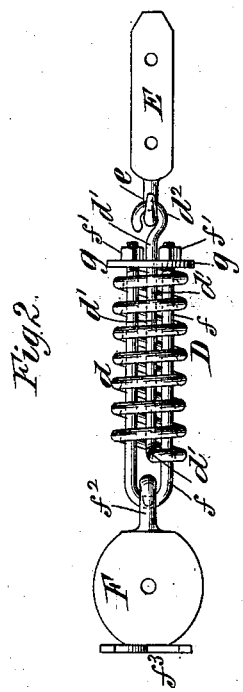
Witnesses:
C. E. Sundgren
Matthew Pollock
Inventor:
Frank Callan
by his Attys
Brown & Hall

United States Patent Office.

FRANK CALLAN, OF BINGHAMTON, ASSIGNOR OF ONE-HALF TO CHARLES COOK, OF NEW YORK, N. Y.

TONGUE-SUPPORT FOR VEHICLES.

SPECIFICATION forming part of Letters Patent No. 321,082, dated June 30, 1885.

Application filed May 7, 1885. (No model.)

*To all whom it may concern:*

Be it known that I, FRANK CALLAN, of Binghamton, in the county of Broome and State of New York, have invented a new and useful Improvement in Tongue-Supports for Vehicles, of which the following is a specification.

My invention relates to a support whereby the weight of the pivoted tongue or pole of a vehicle will be sustained, and the tongue or pole be kept in an approximately horizontal position, and the horses be relieved of the weight thereof.

The object of the invention is to provide a simple and effective support for the purpose above described, which may be made and sold at a small cost.

The invention consists in the combination, with a pivoted pole or tongue and axle of a vehicle, of an extensible spring-support connected at one end with the inner end of the pole, and at the other end connected with the axle at a point below the pole, and serving by its elastic resistance to extension to sustain the tongue or pole, and to maintain the front end thereof in an elevated position.

The invention also consists in a spring or elastic support of a novel construction, hereinafter described, and pointed out in the claims, and in the combination of such spring or elastic support with the tongue or pole of a vehicle.

In the accompanying drawings, Figure 1 represents a sectional view of an axle and a side view of a pole or tongue which is sustained by a spring-connection between its rear end and the axle, and Fig. 2 represents a plan view of my improved support and the devices whereby it is to be connected with the axle and tongue or pole.

Similar letters of reference designate corresponding parts in both the figures.

A designates the tongue or pole, which is pivoted at $a$ between hounds B, only one of which is shown, and C designates the axle of the vehicle.

D designates the support or connection between the end of the tongue or pole rearward of its pivots $a$ and the axle C. This connection prevents the rising movement of the rear end of the tongue or pole, and thereby maintains the tongue or pole in an approximately horizontal position, and prevents its front end from falling. The construction of this support D which I now deem preferable will be best understood from Fig. 2, as will also the device whereby it is connected with the pole and axle.

The support D consists, essentially, in a strong spiral spring, $d$, one end or member of which, $d'$, is turned inward and extended lengthwise through the spring and considerably beyond the end thereof. The member or arm $d'$ is provided beyond the end of the spring with a hook, $d^2$, and this hook may be connected with a hook, $e$, upon the plate E, which is bolted fast to the end of the tongue, as shown in Fig. 1. The support also comprises a U-shaped loop or shackle, $f$, which is of greater length than the spring, and the parallel arms or members of which extend through the spring and through a metal plate or follower, $g$, which bears against the end of the spring. The arms or members of the loop or shackle $f$ are provided with screw-threads at their ends, which extend through the plate $g$, and to them are applied nuts, $f'$, whereby provision is afforded for increasing or diminishing the length of the support between the end of the loop or shackle $f$ and the hook $d^2$.

F designates a plate which is bolted or otherwise secured to the under side of the axle C, and which has formed upon it a hook, $f^2$, with which the loop or shackle $f$ is engaged. The plate F also has upwardly-projecting arms or toes, $f^3$, at its rear end, which bear against the inner side of the axle, as shown in Fig. 1.

It will be seen that any pull which the pole may exert upon the hook $d^2$ by reason of the unbalanced weight of its forward end will serve to compress the spring $d$, the plate or follower $g$ being sustained by the nuts $f'$ on the loop or shackle $f$, and serving as an abutment for the end of the spring.

The support just described is very simple in construction, and may be made at a small cost, and by the hooks $d^2$ and $f^2$ provision is afforded for readily connecting it with and disconnecting it from the vehicle.

It is obvious that the connection which each end of the spring-support has with the plates E or F may consist of a hook and an eye; hence, instead of having hooks $d^2$ e formed upon the spring-support and the plate E, an eye may be substituted for either of these hooks, and would be the equivalent of a hook.

I am aware that pole-supports of various kinds have been connected with a pivoted pole in various ways to sustain its front end. In one construction heretofore devised a bent or semi-elliptic spring has been connected at its ends with the hounds of the vehicle, and has pressed downward with its middle portion on the rear or inner end of the pole. In another construction an elastic or spring support has been connected at one end with an upwardly-projecting arm on the pole adjacent to the pivot, and at the other end connected with the bolster, the spring-support occupying a horizontal position. I do not desire to include in my invention either of the supports above described, but limit my invention to a support connected at one end with the pole rearward of its pivot, and at the other end connected with the axle at a point below the pole. By this combination of parts the support exerts a downward pull directly on the rear end of the pole, and hence is most effective in sustaining the pole. The particular construction of the spring-support here shown and described is most desirable because of its simple construction, and this desirable quality is produced by bending one end portion of the spring inward and extending it through the spring and to a point beyond the other end thereof, where it is provided with a hook.

What I claim as my invention, and desire to secure by Letters Patent, is—

1. The combination, with a tongue or pole and an axle of a vehicle, of an extensible spring-support connected at one end with the inner end of the pole, and at the other end connected with the axle at a point below the pole, and serving by its elastic resistance to extension to sustain the tongue or pole and prevent its falling, substantially as herein described.

2. The spring-pole or tongue-support herein described, consisting of the spiral spring $d$, having one end portion or arm, $d'$, bent inward, and extending through the spring to and beyond the other end of the spring, and there provided with a hook, $d^2$, the plate or follower $g$, against which one end of the spring bears, and a U-shaped loop or shackle, $f$, arranged within the spring, and having its ends secured to the plate or follower $g$, substantially as herein described.

FRANK CALLAN.

Witnesses:
MILTON DASHIELL.
C. N. IRONSIDE.